United States Patent [19]

Morizumi

[11] Patent Number: 4,823,202
[45] Date of Patent: Apr. 18, 1989

[54] OPTICAL BEAM-SPLITTING ARRANGEMENTS ON IMAGE SIDE OF A LENS

[75] Inventor: Yoshiaki Morizumi, Moriyama, Japan

[73] Assignee: Dainippon Screen Mfg. Co., Ltd., Japan

[21] Appl. No.: 898,209

[22] Filed: Aug. 20, 1986

[30] Foreign Application Priority Data

Aug. 20, 1985 [JP] Japan ................................. 60-181128

[51] Int. Cl.$^4$ ...................... H04N 1/028; H04N 3/15; H04N 5/335
[52] U.S. Cl. ................................ 358/294; 358/213.28; 358/293
[58] Field of Search .................... 358/294, 41, 43, 50, 358/52, 54, 55, 213.11, 213.13, 293, 213.27, 213.28; 250/578

[56] References Cited

U.S. PATENT DOCUMENTS

| | | | |
|---|---|---|---|
| 4,005,285 | 1/1977 | Price | 250/578 |
| 4,080,633 | 3/1978 | Starkweather | 358/294 |
| 4,143,403 | 3/1979 | Ohnishi | 358/293 |
| 4,272,684 | 6/1981 | Seachman | 358/213.13 |
| 4,415,934 | 11/1983 | Konishi | 358/294 |
| 4,531,054 | 7/1985 | Suzuki | 350/171 |
| 4,725,729 | 3/1988 | Morizumi | 250/237 R |
| 4,786,821 | 11/1988 | Uchida | 358/75 |

FOREIGN PATENT DOCUMENTS

| | | | |
|---|---|---|---|
| 0115366 | 8/1984 | European Pat. Off. | 358/293 |
| 60-121875 | 6/1985 | Japan | 358/294 |
| 61-232763 | 10/1986 | Japan . | |

Primary Examiner—James J. Groody
Assistant Examiner—Randall S. Svihla
Attorney, Agent, or Firm—Ostrolenk, Faber, Gerb & Soffen

[57] ABSTRACT

A picture image of a linear area to be read out of an original picture is projected and focused on a plurality of line sensors. The light flux transmitted through a projecting lens is divided into two light fluxes, along a plane containing the linear area of the original picture and an optical axis of the lens, by a light dividing apparatus disposed at the image side of the projecting lens. The light dividing apparatus thus provides two light fluxes which are projected and focused on respective line sensors. The light dividing apparatus comprises one or two flat mirrors which are so disposed that one side edge of each mirror coincides with or is disposed near to the plane along which the entire light flux is divided into two parts. The reflecting plane or reflecting planes of the mirrors are inclined at desired predetermined angle(s) with respect to the optical axis of the projecting lens in order to project the light onto the light sensors.

8 Claims, 10 Drawing Sheets

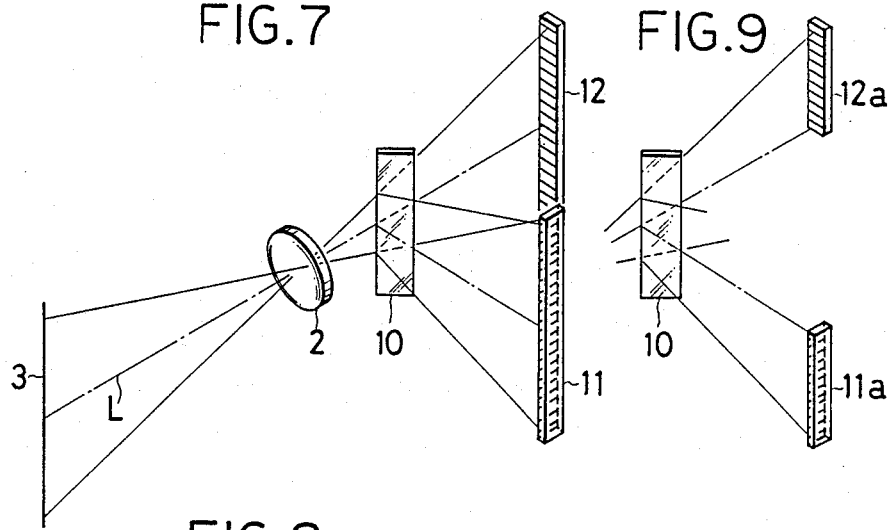
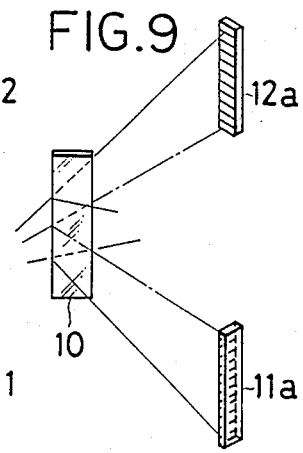
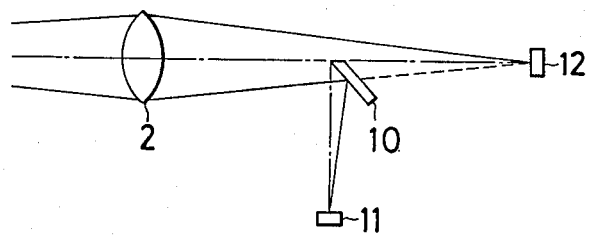
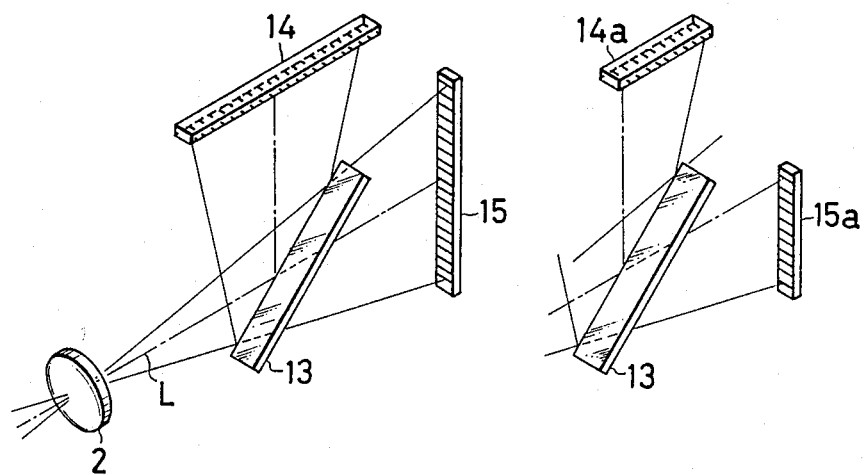
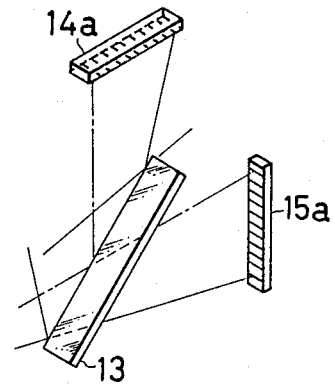

OPTICAL BEAM-SPLITTING ARRANGEMENTS ON IMAGE SIDE OF A LENS

BACKGROUND OF THE INVENTION

The present invention relates to a picture reading apparatus which, by projecting an original picture on a photoelectrical element(s), reads out picture information of the original picture, and particularly relates to a device with improved resolution which operates by reading out information of an original picture by scanning the original picture in line sequence by using one or more line sensors composed of a plurality of linearly aligned photoelectric elements.

In order to improve the resolving power of a picture reading apparatus which uses a line sensor(s), it is known to increase the number of photoelectric elements composing the line sensor. However, the maximum number of photoelectric elements is limited. Accordingly there have been proposed various kinds of means for obtaining better resolving power by using a line sensor having relatively small number of photoelectric elements.

For example, the arrangement shown in FIG. 12 is composed of a plurality of sets of projecting optical systems and a plurality of line sensors. The arrangement provides three similar lenses 17, 18 and 19 disposed in parallel with the surface of an original picture 16. An image of the original picture 16 is divided into three portions and each of the divided picture images is projected to focus on each of line sensors 20, 21 and 22, each of which outputs a respective picture image signal. In this case each of the sensors divides desired whole area of the original picture 16 to three equal areas. Then, onto the line sensor 20 images of from an A area to that of B of the original picture are projected, onto the one sensor 21 images of the area B to an area C of the original picture 16 are projected, and onto the one sensor 22 images of the C to an area D are projected. Accordingly, resolving power is improved up to three times as compared to the case in which the whole area from the A to the D is projected onto a single line sensor.

In addition, it has also been proposed to use only one projecting optical system, an optical path being separated to two optical paths by using a half mirror to divide the area of the original picture into two equal parts, and then projecting each of the divided areas onto the respective lens sensors. The latter method produces excellent resolving power, nearly two times than that of the usual case.

FIG. 13 is an example in which a projecting lens 24 and a plurality of line sensors 26, 27 and 28 are used. Between the projecting lens 24 and each of the sensors a half prism 25 is disposed to divide a light flux transmitted by the lens 24, and to emit each of the divided light fluxes to a respective line sensor. In this case too the entire area of the original picture 23 is divided into three equal parts, and each of areas AB, BC or CD is projected onto a respective line sensor. In this case resolving power three times better than the usual method is obtained.

Further, there has also been proposed an arrangement as shown in FIG. 14. In this arrangement, at the rear stage of a lens 30, a dual-faced mirror 31 is provided to divide the light flux into two light fluxes, and to emit the light fluxes to line sensors 32 and 33, respectively. In this arrangement a desired area of the original picture 29 is divided into two parts, AB and BC to improve resolving power up to two times. In addition, as a means for improving resolving power without dividing light flux there has been known a device, as shown in FIG. 16, which comprises a plurality of line sensors 34 and 35 which are disposed in parallel and offset lengthwise from one another such as to be phase shifted from one another. In this device the images of the linear area of the original picture are shifted to a direction of the line sensors being disposed in parallel, and picture information in the identical area is read out with a plurality of the line sensors. In the device each of the several unit elements is disposed so that respective phases are offset from one another, which results in that each of output information of the line sensors is mutually interpolated. As can be judged from the above, the total resolving power is improved based on the number of line sensors being used.

Each of the devices according to the above described prior art has practical disadvantages. In the means shown in FIG. 12 in which a plurality sets of lenses and line sensors are used, it is extremely difficult to provide a desired number of lenses all of which have identical focal lengths, even if the lenses are of the same standard, for there is unavoidable unevenness in focal length of the lenses due to manufacturing tolerances. Accordingly, in practice lenses having relatively close focal lengths are used. In that case, as a distance between the lenses and the surfaces of the original picture, a value like a G.C.D. (the greatest common divisor) of each of values determined by biasing on each of focal lengths of respective lenses according to desired magnification is to be selected, so that an out of focusing phenomenon is apt to occur.

Next, the device shown in FIG. 13 uses only a single lens, so that the disadvantage described above is avoided. However, between the lens and each of the line sensors there is provided a half prism 25, so that efficiency of the optical system is restricted with aberration of the half prism 25, and further in order to take in, that is, emit a light flux to the line sensors radiated from the whole desired areas of the original picture, it is required that a considerably larger size of the half prism 25 be selected, which results in manufacturing difficulty and prohibitive expense.

There is also the idea to use a flat half mirror instead of using the half prism. However, the flat half mirror approach generates a difference in lenghts of the light path between the reflecting surface of the half mirror and the focusing plane and that of between the transmitting surface of the half mirror and the focusing plane, so that correcting means for correcting the difference is required. For example, one solution is to neglect to a certain extent slippage of focusing, the line sensors being disposed at positions where the identical magnification can be obtained. Or, parallel flat plane glasses are disposed at desired positions in the light path divided by the half mirror to correct the difference. In addition, where a thin half mirror is used, the opaque film is provided, appropriately coated with transparent film for handling the difference in length between the light paths, which lowers its flatness in response to increase of the size thereof. This results in occurrence of distortion in picture images, and further there are other disadvantages which cause flaws and maintenance difficulties.

In the prior device shown in FIG. 14 there is a problem of partial unevenness in the obtained light quantity. With respect to this problem Japanese Patent Application No. 60-73582 (entitled "AN APPARATUS FOR CORRECTING UNEVENNESS OF LIGHT QUANTITY IN AN OPTICAL REPRODUCTION SYSTEM" by the inventor herein) describes an arrangement wherein light emitted to two line sensors 32 and 33 such that light flux from the B point on the original picture 29 positioned on the optical axis of the lines 30 is divided into two light fluxes, and emitted to B' or B" on the two line sensors. On the other hand other light fluxes from the ends A or C of the original picture are the whole light quantity being transmitted by the lens or nearly same light quantity having emitted to an A' or a C', so that the quantity of light received by the line sensors has the distribution shown in FIG. 15. Further, the device shown in FIG. 16 must be adapted such that in order to project the identical picture image area sequentially by a plurality of line sensors, a picture image signal output from the preceding line sensor is stored in memory means and synchronized with a picture image signal output from the following sensor, and has to be read out and recombined with the image signal of the second line sensor.

SUMMARY OF THE INVENTION

It is an object of the present invention to provide a picture reading apparatus for reading out picture images in a linear area of an original picture by projecting the picture, with a projecting lens, onto the surfaces of a plurality of line sensors.

According to the present invention the picture image of a linear area to be read out of an original picture is projected and focused on a plurality of line sensors by a projecting lens. The light flux passing through the projecting lens is divided into two light fluxes along that plane which contains the linear area of the original picture and the optical axis of the lens. The light dividing means, to be described below, is disposed at the rear, i.e. on the image side, of the projecting lens so that each of the two light fluxes may be projected and focused on a respective line sensor. The light dividing means is preferably constituted of one or two flat mirrors which are disposed so that one side edge of the single or plural mirrors coincides with or is near the aforementioned plane which divides the light flux into two fluxes. The reflecting plane or reflecting planes of the mirrors are inclined at desired predetermined angle(s) with respect to the optical axis of the projecting lens.

The light flux passing through the projecting lens is divided into the two light fluxes, along the plane containing the linear area to be read out of the original picture and the optical axis of the lens, by the flat mirror which projects and focuses each of the divided light fluxes to a respective line sensor. Since the flat mirror is of the surface reflecting type, there is no difference in length between both light paths as opposed to the case of a half mirror. Consequently, identical focusing of each light flux is obtained. Further, at any point on the focusing plane, the emitted light flux is one half of the entire light flux transmitted by the lens. Thus, improved focusing, free from unevenness in light quantity, is obtained.

Each of FIGS. 4, 5, 6, 7, 8, 9, 10 and 11 shows a respective variant embodiment of the present invention.

Each of FIGS. 12, 13, 14 and 16 show a respective prior art apparatus.

Figure 14:
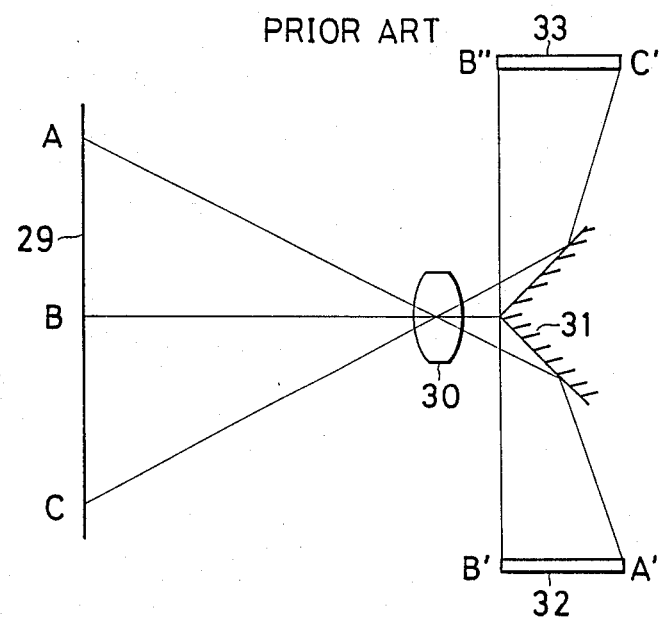
Figure 15:
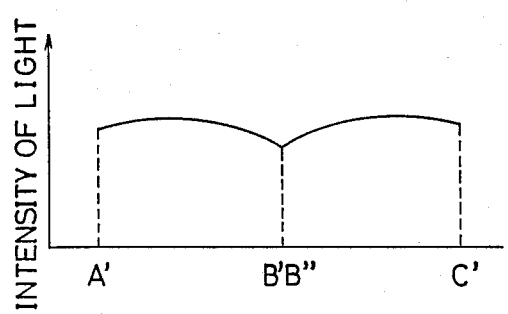
Figure 16:
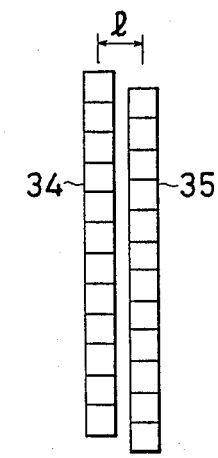

FIG. 15 is a graph showing the distribution of light for the apparatus shown in FIG. 14.

DETAILED DESCRIPTION OF THE INVENTION AND PREFERRED EMBODIMENTS

Figure 1:
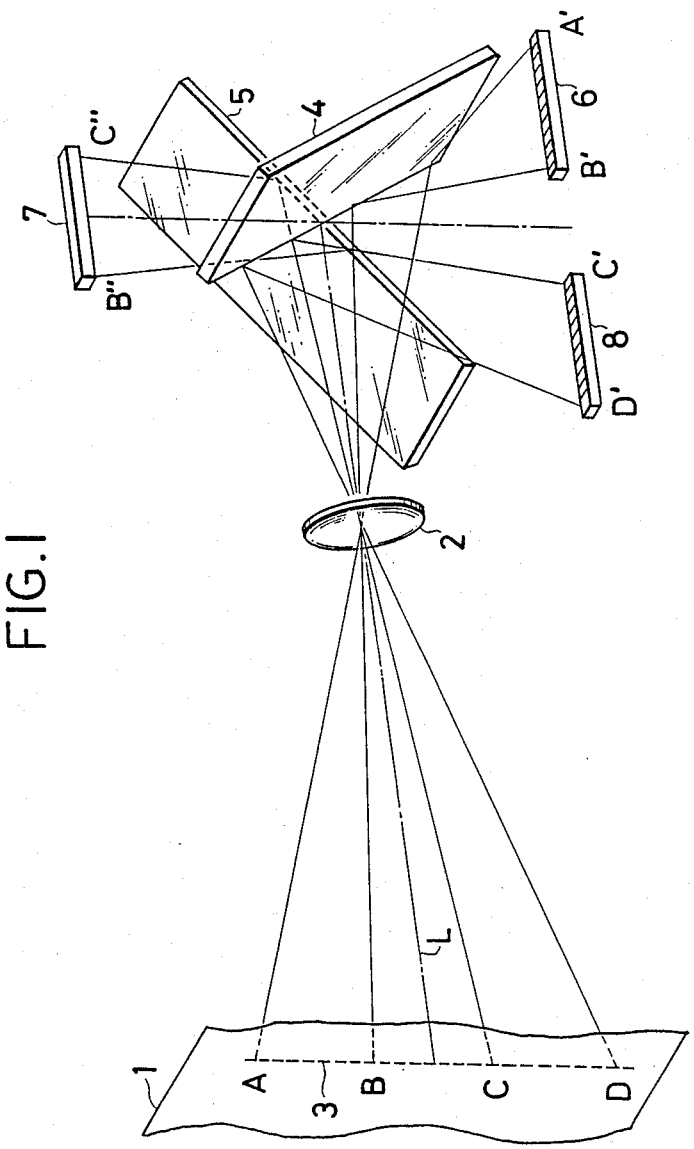
FIG. 1 is a perspective view showing an outline of one embodiment of an apparatus according to the present invention.

FIG. 1 is a perspective view of an apparatus of the present invention. A lens 2 is disposed oppositely to an original picture 1, and picture images on a linear area 3 to be read out of the original picture 1 are projected and focused into three line sensors 6, 7 and 8 through two flat mirrors 4 and 5. The flat mirrors 4 and 5 extend to the left and right sides from a plane (hereinafter referred to as the "dividing plane") which contains the linear area 3 and an optical axis L of the lens 2. The mirrors 4 and 5 are inclined in inverse directions at angles of 45 degrees with respect to the linear area 3. They are so disposed that they intersect and form a crossing point at the optical axis of the lens 2.

Accordingly, the light flux transmitted through the lens 2 is divided into two light fluxes. One is reflected off the surface of the mirror 4 and forms focused images on the surfaces of a line sensors 6 and 8, located below the mirror 4. The other light flux is reflected off the surface of the mirror 5 and focuses on the surface of line sensor 7 located above the mirror 5. More particularly, three areas obtained by dividing the linear area 3 into three parts of equal length including an area [AB] projected onto the line sensor 6 and focused thereon, an area [BC] projected on the line sensor [7] and focused thereon, and an area [CD] projected and focused on line sensor [8].

In this case, a respective one of the two divided light fluxes is projected to each of the line sensors, so that the quantity of light received at each of the line sensors is ½ of the total light quantity that would have been received if the total light flux transmitted through the lens 2 would have been projected. Further, if the end surface of each of the mirrors extends to the dividing plane, irregular reflection occurs at that part, which can lower contrast, caused by flare light. In practical reflection prevention processings, such as painting etc., it is preferable that an appropriate space be left between the two mirrors. In this case though the effective reflecting surface is further reduced and the light received at each of the light sensors becomes smaller. However, this reduction in light quantity has no practical effect.

Figure 2:
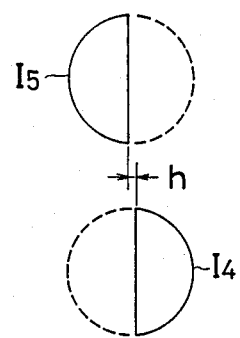
FIG. 2 is a diagram showing section of a projecting light flux in the apparatus of FIG. 1.

FIG. 2 shows the above-described conditions diagrammatically. A partially dotted circle represents the whole light flux of a certain pixel point, and areas ($I_4$) and ($I_5$) in each of the dot lines indicates each of the light fluxes reflected on the mirrors 4 and 5, respectively. That is, in the case where a gap of width [h] is provided between the two mirrors, a unit light receiving quantity of each of the sensors is less than ½ as compared with that of the directly received total light flux which is transmitted by the lens 2.

Figure 3:
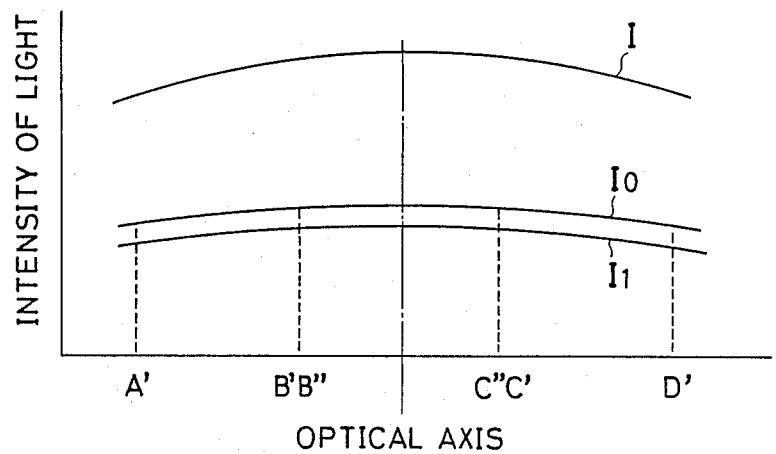
FIG. 3 is a graph showing distribution of light quantity.

In FIG. 3 the graphs indicate the above described light quantity lowering conditions, in which a curve [I] indicates the quantity of the total light flux transmitted by lens 2, a curve [$I_0$] indicates distribution of the light quantity on the surface of the line sensor, and a curve [$I_1$] shows distribution of the light quantity in the case where no countermeasure is taken to account for the aforementioned flare light. However, the lowering in light quantity is not crucial to a picture reading apparatus. For example, by increasing illumination of the original picture, or by increasing the amplification of the output signal from the line sensor the above noted shortcoming can be overcome.

In the above described embodiment the two flat mirrors 4 and 5 are so disposed that they are inclined with respect to the optical axis L of the lens at an angle of 45 degrees in mutually inverse directions. However, the angle is not limited to 45 degrees, and any angle close thereto may be selected. That is, in the case where the line sensors are disposed in parallel to the optical axis L of the lens the two flat mirrors are disposed at angles of 45 degrees to the optical axis. But in the case where the line sensors are not parallel to the optical axis of the lens, the inclination angle of the flat mirror may be selected to have another value. The aforementioned can be applied to any of the embodiments described hereinafter.

The above description is based on the embodiment of FIG. 1. However, the scope of the present invention is not limited to that embodiment and can assume various modifications. For example, in the above described embodiment the linear area of the original picture is divided into three equal areas, projected and focused onto three line sensors. However, the number of divisions is not limited to three. Two, four, or more than four divisions may be selected as shown in FIGS. 4 and 5.

Figure 4:
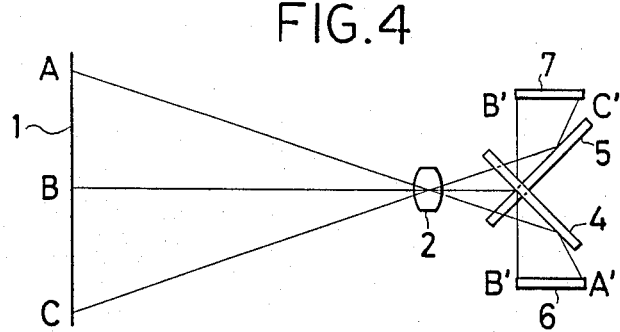

In FIG. 4, the linear area of an original picture is divided into two light flux parts, through an optical system comprised of the lens 2 and two flat mirrors 4 and 5, as shown in FIG. 1. The light flux beams are projected and focused onto two line sensors 6 and 7. Thus, the optical paths are similar to those of the conventional ones shown in FIG. 14. But in the case of the embodiment of the present invention, a light flux emitted to the line sensors is divided into two light fluxes at any position by that plane which is parallel to the direction of the light flux advances (a plane which is parallel to the surface of this paper), so that in this embodiment there is less discreteness of distribution of light quantity in comparison with that of the conventional one shown in FIG. 14.

Figure 5:
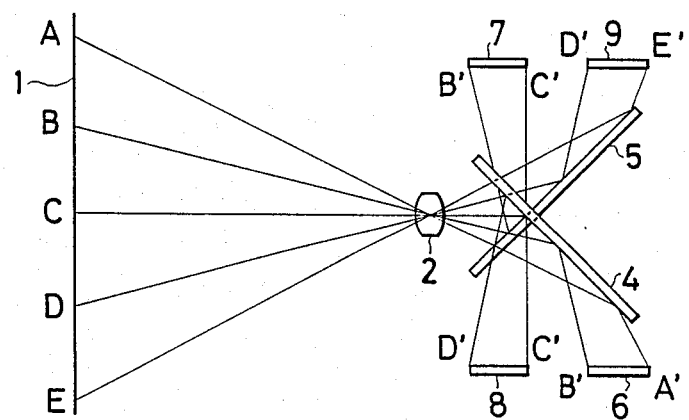

In FIG. 5 there is shown another embodiment of the present invention in which the linear areas of the original picture 1 is divided into four parts, through the same optical system, the parts being projected and focused onto four line sensors 6, 7, 8 and 9. In this embodiment it is possible to obtain resolving power of four times that obtained in the case of the whole linear area from A to E being projected onto a single line sensor.

Figure 6:
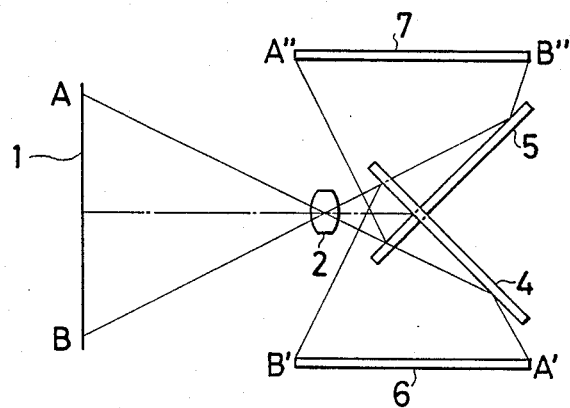
Figure 12:
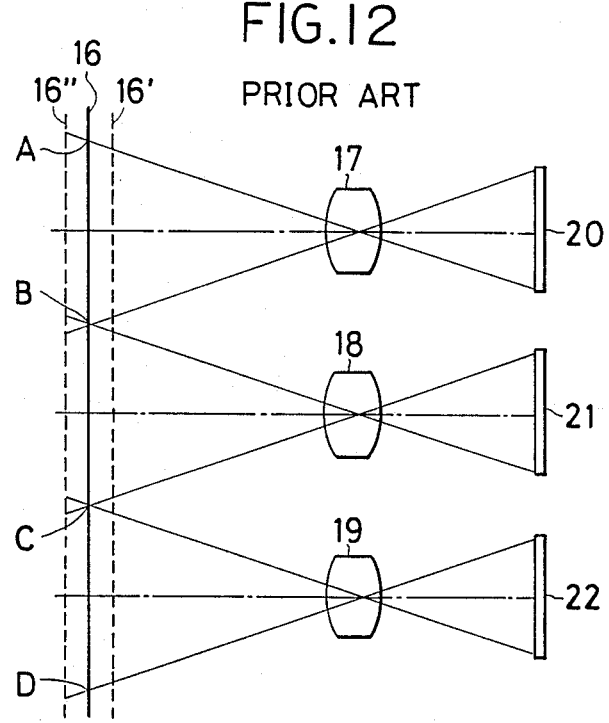
Figure 13:
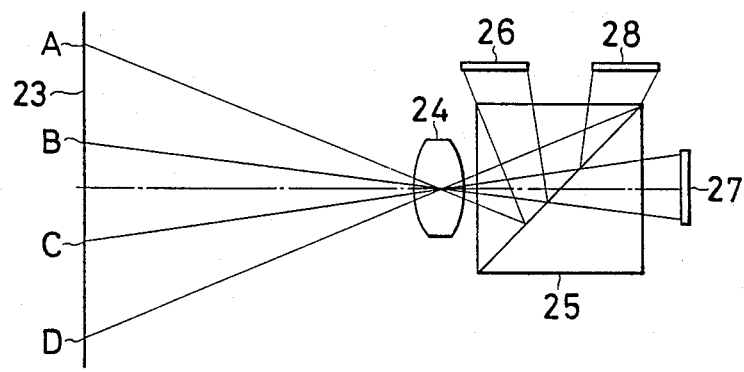

In FIG. 6 there is shown another embodiment in which the linear area on the original picture 1 is not divided. However, through the aforementioned optical system the image is projected and focused onto two line sensors 6 and 7. In this embodiment, the resolving power of each of the line sensors is equivalent to each of their proper ones, but in this embodiment the configuration of photoelectric elements in the two line sensors is changed so that the phase of the photoelectric elements in each element is offset by ½ pitch relative to one another. That is, the output signals of these line sensors can be so synthesized as to obtain a substantially twice improved resolving power. Further, in all of the aforementioned embodiments, except for the embodiment of FIG. 6, the plurality of line sensors have the same length, and accordingly, the linear area of the original picture can be read out by dividing the area into the equal areas. However, there is no necessity of dividing the area into equal areas. Line sensors of different lengths may also be used.

In the embodiments of FIGS. 1 to 6, two flat mirrors 4 and 5 are disposed at both sides of the dividing plane. However, the present invention is not limited to this configuration. It is also possible to provide only a single flat mirror disposed at one side of the dividing plane. FIGS. 7 to 11 show such embodiments. In FIG. 7, a flat mirror 10 having a surface parallel to the linear area 3 of the orignal picture is disposed so that one of its side edges coincides with or is disposed near to the dividing plane. The mirror is inclined at a suitable angle to the optical axis L. According to this construction, as shown in FIG. 8, ½ of the light flux reflects off the surface of the flat mirror 10 and the remaining ½ thereof directly advances to project and focus onto each of the lines sensors 11 and 12. In this case it is preferable that an end portion i.e. one side edge of the flat mirror 10 is made to be a knife edge form according to the inclination angle of the mirror so as to prevent the light flux from being dispersed.

In the embodiment of FIG. 7, the two sensors 11 and 12 extend over a distance corresponding to the whole length of the linear area 3 of the original picture 1. However, the phases of the photoelectric elements composing each line sensor are offset by ½ pitch relative to one another. The resolving power of a synthesized output picture image is improved to twice that obtained otherwise. In this case it is rather difficult to exactly regulate the positions at which the line sensor are to be disposed, so that, as shown in FIG. 9, each of two line sensors 11a and 12a measures about ½ the length of the aforementoied sensors in order to divide the picture area into two lengthwise divided parts. It is more practical to synthesize an image from the sensors 11a and 12a of FIG. 9.

In FIG. 10, the mirror 13 has a vertical surface and it approaches the dividing plane with its side edge. Further, the mirror is inclined to the linear area of the original picture at a desired angle. And, as in FIG. 7, one half of the light flux reflects off the surface of the mirror 13, while the remaining light flux advances directly to and projects and focuses onto the line sensors 14 and 15, respectively.

In an embodiment, of the type shown in FIG. 7, it is difficult to locate the line sensors so that each photoelectric element of each sensor is offset by one half pitch relative to a corresponding photoelectric element in the other sensor. It is, therefore, more practical to produce each line sensor 14a and 15a to a half length so that one half of the entire picture area is projected on each sensor. The inclination angle of the flat mirror 10 or 13, in the embodiments shown in FIG. 7 to FIG. 11, is not limited to 45 degrees, but can be selected freely. It is also possible to dispose it so that it is inclined in two directions.

The effects and functions of the present invention are as follows:

(1) Without reducing the unit size of each photoelectric element of a line sensor, the resolving power of an output picture image is improved.

(2) Irregularities related to the light quantity emitted to a line sensor(s) can be limited to the range of errors that typically occur around peripheral regions in an optical system. The range of errors does not exceed the range of errors typically found in an optical system and can therefore be easily dealt with.

(3) The mirror(s) to be used, in accordance with the present invention, is a surface reflection type flat mirror which can be manufactured and maintained with relative ease and at low cost.

(4) The finished picture image has excellent quality and no distortion.

(5) Picture signals corresponding to the identical area of the original picture can be output simultaneously from a plurality of line sensors. Therefore, no memory or storing means are necessary, as opposed to the conventional case of deploying a plurality of parallel line sensors.

What is claimed is:

1. A picture reading apparatus for imaging a linear area of an original picture, said reading apparatus comprising:
   a projecting lens for receiving light from the linear area of the original picture and transmitting said light through said lens, said lens having an optical axis, an object side and an image side;
   a plurality of line sensors each having a respective plurality of linearly aligned photoelectric elements; and
   a light dividing means, disposed on the image side of said projecting lens in a position to receive at least a portion of said light transmitted through said projecting lens, said light dividing means being effective for dividing said received light into a plurality of light beams and directing each of said light beams to a respective one of said line sensors, said light dividing means including two flat mirrors, disposed on opposite sides of an imaginary plane which contains said linear area and said optical axis, each of said two flat mirrors being inclined relative to said linear area and said two flat mirrors being inclined in inversely opposed directions.

2. A picture reading apparatus according to claim 1, wherein said two flat mirrors are inclined in inversely opposed directions at angles of 45° relative to said linear area.

3. A picture reading apparatus according to claim 1, wherein said two flat mirrors meet on the optical axis of said projecting lens.

4. A picture reading apparatus according to any one of claims 2, 3 or 1, wherein each of said line sensors is positioned at a different respective focusing plane formed by said projecting lens and said light dividing means, and wherein said line sensors are arranged such that a different respective portion of said linear area is focused on each of said line sensors.

5. A picture reading apparatus according to claim 4, wherein said line sensors have equal lengths, and wherein the different respective portions of said linear area have equal lengths.

6. A picture reading apparatus according to any one of claims 2, 3 or 1, wherein said plurality of line sensors is two line sensors, wherein each of said two line sensors is positioned at a different respective focusing plane formed by said projecting lens and said light dividing means, and wherein said two line sensors are arranged such that said linear area is focused on each of said two line sensors in such a manner that the resulting two images of said linear area are offset from each other by one-half of the pitch at which the photoelectric elements of the two line sensors are disposed.

7. A picture reading apparatus according to claim 1, wherein each of said two flat mirrors has a respective side edge and said side edges touch one another on the optical axis of the projecting lens.

8. A picture reading apparatus according to claim 1, wherein said two flat mirrors have crossed side edges which cross at the optical axis of the projecting lens, the crossed side edges being spaced from one another at the optical axis.

* * * * *